United States Patent [19]

Soza et al.

[11] Patent Number: 4,782,217
[45] Date of Patent: Nov. 1, 1988

[54] FINANCIAL TRANSACTION TERMINAL AND CARD READER SYSTEM ADAPTABLE THERETO

[75] Inventors: Harry R. Soza; Dennis E. Wilkison; Craig C. Williams, all of San Jose; Thomas J. Clark, Santa Clara, all of Calif.

[73] Assignee: Norand Corporation, Cedar Rapids, Iowa

[21] Appl. No.: 892,751

[22] Filed: Jul. 31, 1986

[51] Int. Cl.⁴ ............................................. G06K 5/00
[52] U.S. Cl. .................................. 235/380; 235/432; 235/448; 235/449; 340/825.34
[58] Field of Search ............... 235/448, 449, 380, 381, 235/382, 432; 340/825.34, 825.35

[56] References Cited

U.S. PATENT DOCUMENTS

| | | | |
|---|---|---|---|
| 3,641,499 | 2/1972 | Housman | 235/380 |
| 3,651,310 | 3/1972 | Link | 235/380 |
| 3,760,164 | 9/1973 | Kral | 235/483 X |
| 3,818,187 | 6/1974 | Lovendusky et al. | 235/380 |
| 3,863,050 | 1/1975 | Brugger et al. | 235/448 X |
| 4,288,825 | 9/1981 | Hasuo et al. | 235/449 X |
| 4,396,902 | 8/1983 | Warthan et al. | 235/449 X |
| 4,684,791 | 8/1987 | Bito | 235/380 |

*Primary Examiner*—Philip H. Leung
*Attorney, Agent, or Firm*—Neuman, Williams, Anderson & Olson

[57] ABSTRACT

A single unitary terminal configuration includes a card reader for reading data contained on a credit or debit card, a communications system for accessing a central database for authorization purposes, an input/output system for inputting alphanumeric data into the terminal, and for displaying audio and visual signals concerning the use of the terminal and the card's status, and a printer for printing data onto a receipt. The terminal preferably includes a fixed head magnetic card reader for reading magnetic stripes of credit or debit cards. The card reader is preferably of an insertion type having a card receiving channel opening at an edge of the terminal housing.

4 Claims, 5 Drawing Sheets

FINANCIAL TRANSACTION TERMINAL AND CARD READER SYSTEM ADAPTABLE THERETO

BACKGROUND OF THE INVENTION

Credit authorization terminals were originally developed to help credit card issuers avoid losses resulting from transactions approved for invalid credit cards. Before electronic authorization was used, merchants could only resort to "hot lists" that contained the numbers of lost, stolen or otherwise invalid cards. Unfortunately, these lists were often outdated and the process time-consuming for the clerk. As charge-back losses topped the million dollar mark, card issuers developed a system by which merchants could call a number at a processing center to verify transactions on the customer's card. The voice authorization system, which is still used by many merchants, is expensive and time-consuming.

The voice authorization system was supplemented in the late '70s by the current electronic credit authorization systems. Credit authorization terminals read the data encoded on the magnetic strips on the back of credit cards and automatically dial the processing center over telephone lines. Within seconds the host computer can return an authorization number over the same phone line. However, such terminals generally do not include credit card receipt imprinters, and those that do include card readers with movable read heads, which have a large number of moving parts and are therefore difficult and relatively expensive to maintain.

Some terminals are now in use which have the added capability of automatically effecting debits to a user's bank account, when the customer uses a card known as a debit card. These terminals, which may be referred to as debit transfer terminals, suffer the same lacks as credit authorization terminals; namely, they do not include receipt imprinters and fixed head card readers.

It is therefore an object of this invention to provide a unitary debit transfer and verification terminal with printing mechanism, to reduce equipment size, increase convenience, and reduce errors in transferring authorization information onto sales receipts.

It is a further object of this invention to provide a card reader system adaptable to such a terminal, and also enhancing the convenience and versatility of card reading terminals generally.

It is yet another object of this invention to provide such a terminal which is particularly convenient and durable, and readily adaptable to the varying requirements of merchants in the retail field.

SUMMARY OF THE INVENTION

The invention relates to a credit and/or debit card reading terminal including a magnetic stripe card reader for reading information contained on a debit or credit card, and preferably capable of also accommodating a printing means for printing information on a receipt, and communication means for communicating with a central database for checking the validity of the debit or credit card, all contained in a single unit. The terminal preferably includes an alphanumeric display for displaying information concerning the operation of the terminal and for verifying the validity of the card for the transaction in question. A modem preferably can be incorporated for acting as a communications interface between the terminal and the central database. The card reader preferably includes a fixed magnetic head for reading magnetically encoded information from the magnetic stripe of the card, when the card is moved past the head. A keyboard is preferably provided for entering information into the terminal and accessing the database.

A feature of the invention resides in the provision of a card reading terminal adaptable to various functions such as credit and/or debit card authorization, and transaction information printing and/or display, and which is particularly suited to location at a point of sale counter. Related to this are provisions for safeguarding the terminal against impact should it be knocked off a supporting surface. The terminal configuration seeks to minimize the width dimension and to accommodate in one basic housing, terminals adaptable to the requirements of a wide variety of retail merchants.

Advantageously, according to a further feature of the invention, the basic housing configuration will accommodate either a pass-through type card reader wherein the credit or debit card is manually moved along a slot extending from front to rear, or an insertion type card reader wherein the credit or debit card is manually inserted and removed relative to a card receiving chamber with a closed interior end. Advantageously, such an insertion type card receiving chamber can open at an edge of the terminal housing so as to be particularly conveniently accessible.

According to another feature, a card reading terminal can be mounted either horizontally or vertically and still provide convenient access to the edge-opening type card reader.

Other objects, features and advantages will be apparent from the following detailed description taken with the accompanying sheets of drawings, and from the individual features and relationships recited in the appended claims.

BRIEF DESCRIPTION OF THE DRAWINGS

FIG. 10 is an enlarged partial transverse sectional view for illustrating details of the card reader of FIG. 7;

DESCRIPTION OF THE PREFERRED EMBODIMENTS

Figure 1:
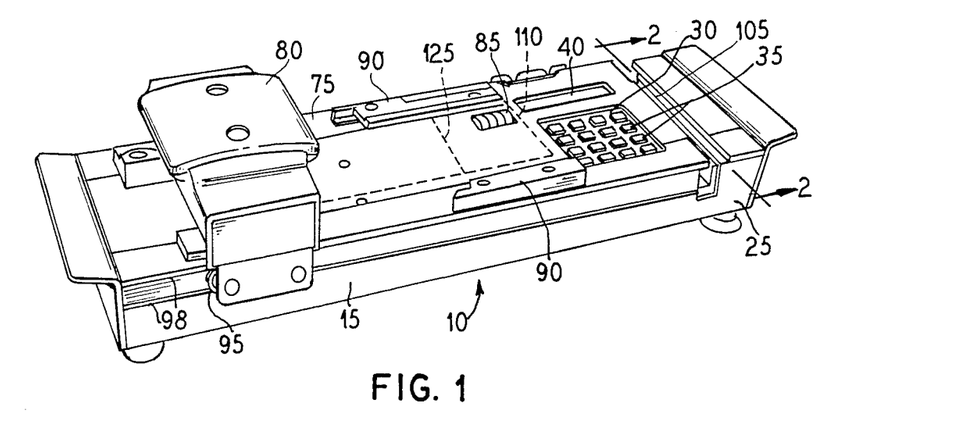
FIG. 1 is a perspective view of a debit transfer and verification terminal and printer, showing a preferred embodiment of this invention.
Figure 1O:
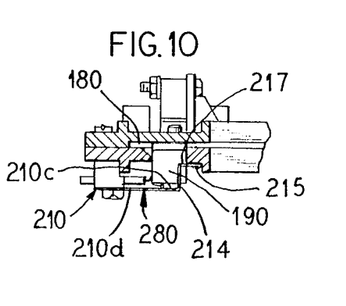
Figure 4:
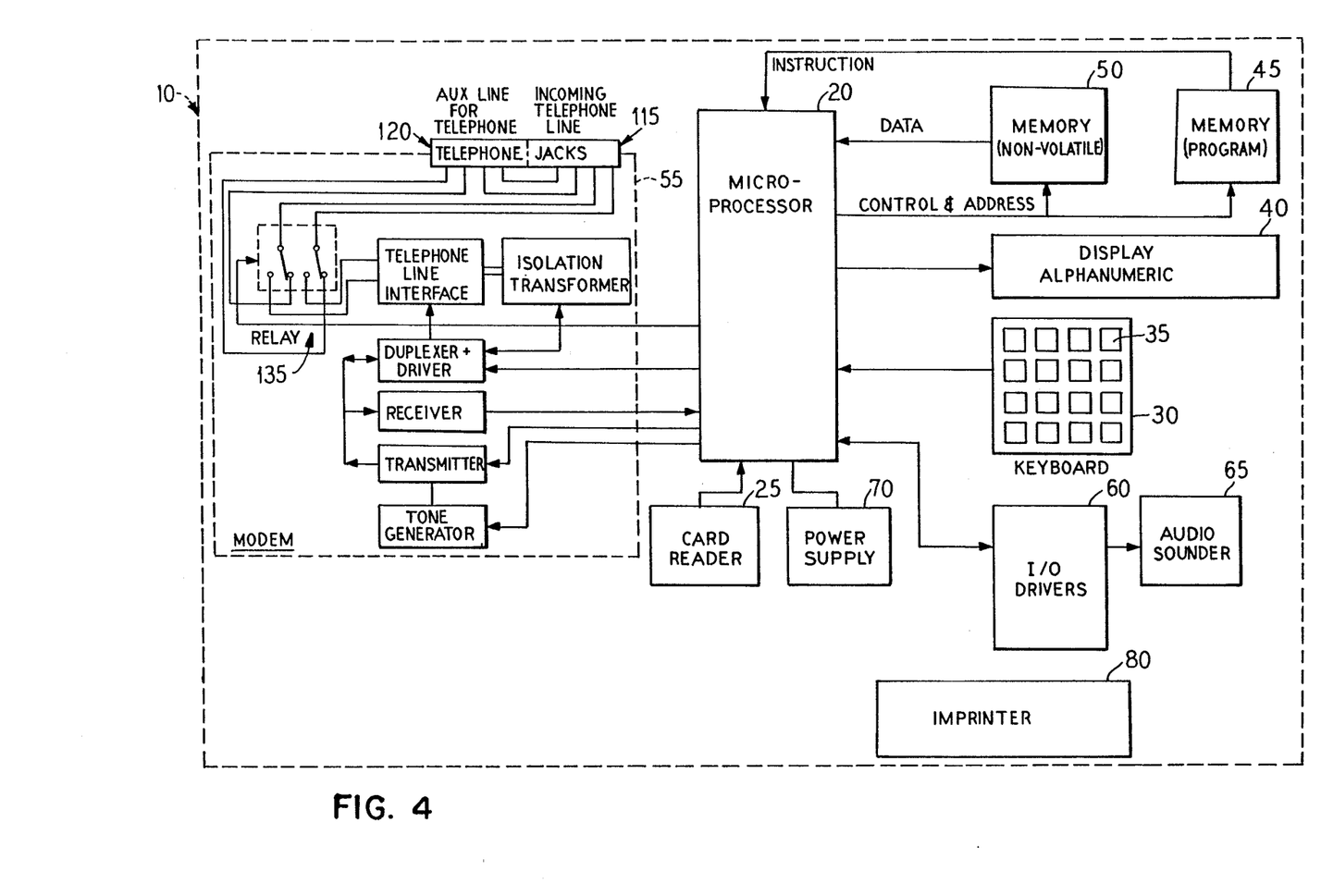
FIG. 4 is a block diagram of the components of a terminal according to the present invention.

FIG. 1 shows a perspective view of a debit transfer and verification terminal 10 according to the present invention. FIG. 4 is a block diagram showing components which may be incorporated in the terminal 10. The terminal 10 includes a housing 15 carrying a microprocessor 20 (shown in FIG. 4) in the interior thereof. Although FIG. 4 shows the preferred configuration of the components, other configurations and different components may be used without changing the character of the instant invention. Examples of alternative configurations may be found in U.S. Pat. Nos. 3,818,187, 3,938,090, 3,651,310 and 3,564,210, which are incorporated herein by reference.

Also incorporated by reference are three documents entitled: (1) "Munchkin Engineering Firmware Specification," Jan. 2, 1985 by Dennis E. Wilkison; (2) "MAX Service Manual," February, 1986; and (3) "MAX Hardware Specification," Mar. 20, 1986, and which are on file in the United States Patent and Trademark Office as Appendices A, B and C of Dennis E. Wilkison application for patent "DEBIT TRANSFER AND VERIFICATION TERMINAL" executed by the inventor on June 30, 1986, U.S. Ser. No. 883,556, filed July 9, 1986. These documents, while not essential to the instant disclosure or claims, do provide an exemplary approach to the instant invention in considerable detail, and incorporate features illustrating the state of the art of debit and credit terminals.

A fixed head card reader 25 is attached, preferably in a unitary construction, to the housing 15, and is operatively connected to the microprocessor 20. The microprocessor 20 is of conventional design, such as an Intel 8051 processor, and preferably includes a data random access memory (RAM), and conventional input-output interfaces for communications, display, keyboard input, external memories and input-output drivers.

The terminal 10 includes a keyboard 30 mounted on the housing 15 and operatively connected to the microprocessor 20 for inputting data to the microprocessor 20. The keyboard 30 preferably includes a plurality of multifunction alphanumeric keys 35 for inputting a variety of alphanumeric characters. A display 40 is carried in the housing 15 and operatively connected to the microprocessor 20. The display 40 may be a conventional liquid crystal display, such as the Hitachi HD44780.

A program memory 45 (such as an Intel 27128 EPROM) and a non-volatile memory 50 (such as a Xicor 2864 EEPROM) are preferably operatively connected to the microprocessor 20 and contained within the housing 15. These memories 45 and 50, which are of conventional design, are used for program instructions for the microprocessor 20, for storing data input from the keyboard, and for outputting data for processing and display. A conventional modem 55, such as a Texas Instruments Model TMS99532, is operatively connected to the microprocessor 20, and is also contained within the housing 15. The terminal preferably also includes input/output drivers 60 and an audio sounder 65, also of conventional design, connected to the microprocessor 20 and carried within the housing 15. The microprocessor 20 and all of the above-mentioned peripherals connected thereto are powered by a power supply 70, via power cord 72.

The housing 15 has an upper surface 75 on which is mounted a credit or debit card imprinter 80. Also carried on the surface 75 are a data wheel 85 and flanges 90, the functions of which are described below. The imprinter 80 includes rollers 95 rotatably connected thereto, and the rollers 95 are retained within longitudinal flanges 98, so that the imprinter 80 may be slid back and forth adjacent the upper surface 75. This is a conventional design of card imprinters. The imprinter 80 is preferably manually operated, and is therefore not operatively connected to the microprocessor 20. However, an electrically operated printer may also be used.

Figure 2:
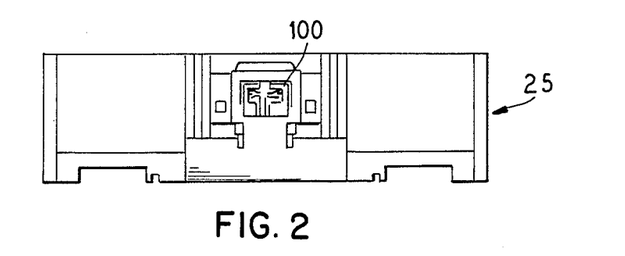
FIG. 2 is an elevation in section taken along the line 2—2 of FIG. 1.

Referring to FIG. 2, the card reader 25 includes a preferably fixed magnetic head 100 of conventional design, configured for reading data from magnetic tracks on standard magnetic stripe debit or credit cards, such as according to ISO Standard 3554. A slot 105 is provided in the card reader 25 for access to the head 100 by a magnetic strip debit or credit card such as card 125 shown in dotted fashion in FIG. 1.

Figure 3:
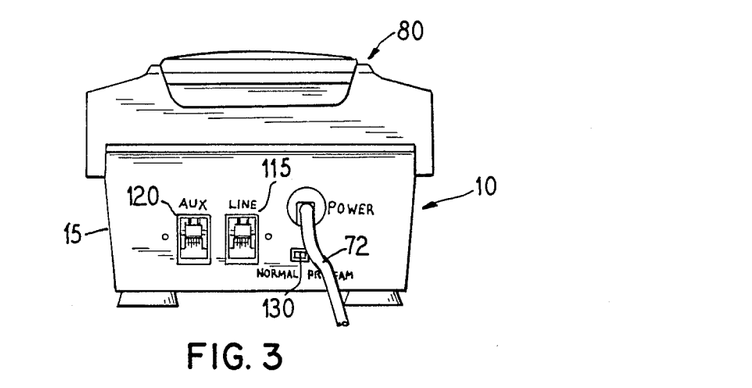
FIG. 3 is an elevation of the right end of the terminal of FIG. 1.

In order to prepare for use of the terminal 10, the terminal is placed in "program" mode. A switch 130 is provided, and is accessible from the exterior of the housing 15. The switch 130 is operatively connected to the microprocessor 20, and places the microprocessor in a mode for receiving data input at the keyboard 30, including data relating to telephone and other access numbers for a central database containing card authorization information. Thus, the user places switch 130 in the "program" setting, and inputs the necessary central database information via keyboard 30. Other information may be input, such as the merchant identification number. As an alternative, information may be input into the microprocessor 20 while the switch 130 is in program setting by use of an external microprocessor, in a conventional manner. Once the necessary information has been input to the microprocessor 20, the switch 130 is replaced in a "normal" setting, as shown in FIG. 3. The information input during the program mode is stored in the program memory 45.

The card 125 is slid through the slot 105, with its magnetic stripe facing towards the head 100; in FIG. 1, the magnetic stripe would be facing to the right. The card reader 25 thereby reads the data carried on the magnetic stripe, and transmits it to the microprocessor 20. Alternatively, the relevant information, such as the transaction amount and the card number and expiration date, may be input to the microprocessor 20 via the keyboard 30. The display 40 is driven by the microprocessor 20 to display prompting messages, in a conventional manner, throughout the data input procedure. Likewise, the input/output drivers 60 and audio sounder 65 may be used for producing prompting signals.

Once the data has been input into the microprocessor 20, a central database is accessed through the modem 55, as shown in FIG. 4. For this purpose, a line jack 115 is provided, attached to the housing 15 and operatively connected to the microprocessor 20. A standard telephone line cord is connected to the jack 115. An auxiliary jack 120 is also provided, into which a standard telephone line connected to a telephone may be plugged, allowing for dual use of the telephone line. To accomplish this, the telephone is disconnected from the circuit, preventing accidental use during a transaction. This is automatically carried out by the microprocessor 20 and a conventional relay 135; typically, the relay 135 is an integral part of the modem 55. The data which is input to the microprocessor 20 is then compared with data from the central database in order to determine whether the card in use is valid for the given transaction. The microprocessor 20 obtains its instructions from memory 45 in a standard manner. Memory 50 may contain telephone numbers, merchant identification numbers, and parameters such as delays required to get through the network, as well as transaction data for later use in bookkeeping.

Meanwhile, the card 125 is placed between the flanges 90 of the terminal 10, atop the upper surface 75. The data wheel 85 may be set, such as to reflect the current date or other information. A conventional receipt 110 is then placed between the flanges 90 so as to cover the credit card 125 and data wheel 85.

Once the microprocessor 20 has received the necessary information on the card from the central database via the modem 55, and has determined whether the card 125 is valid for the given transaction, an appropriate message is displayed on the display 40, and in addition a predetermined signal may be given over the audio sounder 65 to signal the completion of the transaction. If the transaction is approved, the clerk then operates the imprinter 80, and prepares the receipt 110 as usual. Preferably, a transaction approval number appears in the display 40, which is adjacent the receipt 110 (see FIG. 1). Thus, the clerk can easily and quickly copy the approval number onto the receipt 110, minimizing the possibility of error.

The present invention can be used in a number of different ways. For instance, the transactions of an entire day may be stored in the non-volatile memory 50 so as to be checked against the day's receipts at the end of a working day. Similarly, the microprocessor 20 can operate with a central database to automatically debit a debit card user's account, or to increment the outstanding debt of a credit card user's account. A printer port may be provided, for attaching a printer to be controlled by the microprocessor 20, so that each transaction is printed out. Also, a personal identification number (PIN) port such as indicated at 136, FIG. 5, may be provided for allowing a PIN pad indicated at 137, FIG. 6, to be attached to and controlled by the microprocessor 20, so that a debit card customer may be required to insert his PIN number on the pad before completing the transaction. Other variations are possible.

It can be seen that the embodiment of FIGS. 1-4 offers an extremely simplified manner of handling all aspects of a credit transaction in a single unit, with the only exterior device necessary for full operation being the standard central database.

Figures 5, 6, 7:
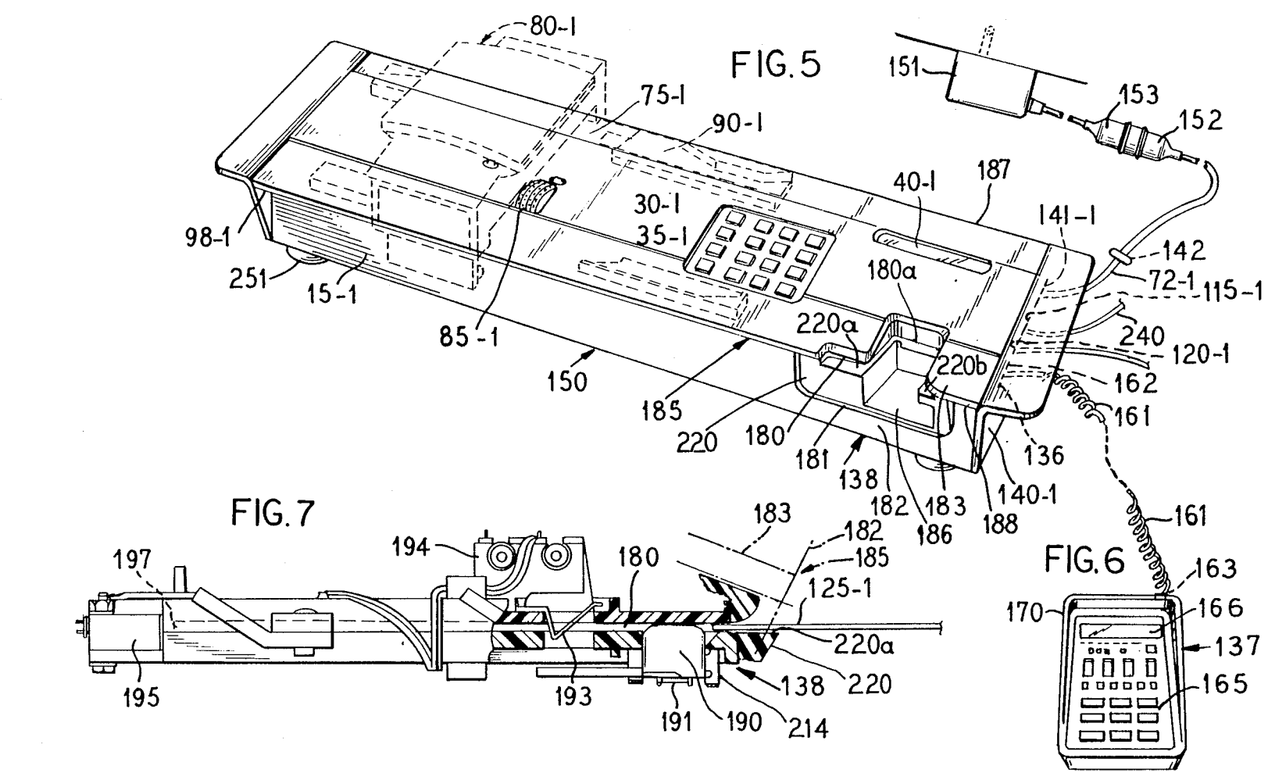
FIG. 5 is a perspective view of a terminal which may be similar to that of FIGS. 1 through 4 except that an insertion type card reader is provided.
FIG. 6 illustrates an auxiliary device which may be connected with the terminal of FIG. 5 when a customer may be required to enter a personal identification code into the system.
FIG. 7 is a somewhat diagrammatic side elevational view illustrating a preferred insertion-type card reader assembly, with a frontal part thereof broken away and in section to show a portion of the card receiving channel.

FIG. 5 shows a transaction terminal which may correspond to that of FIGS. 1-4 except for a preferred end-insert card reader assembly 138 shown in detail in FIGS. 7-11. Reference numerals 15-1, 30-1, 35-1, 40-1, 72-1, 75-1, 80-1, 85-1, 90-1, 98-1, 115-1 and 120-1 designate parts in FIG. 5 which may essentially correspond with the respective parts 15, 30, 35, etc. having respective corresponding reference numerals in FIGS. 1 and 3, so that further description of these parts is not needed. The description with reference to FIG. 4 is also applicable as a description of the internal components and operation of FIG. 5, except with respect to the card reader.

In an early arrangement according to FIGS. 1-4 which combined a credit/debit card imprinter and a card reader, the card reader was in the form of a subassembly fastened at the right-hand end of the housing (opposite the imprinter end). In the preferred embodiments of FIGS. 1-4 and 5-11, each card reader (25, 138) is in the form of a subassembly which is spaced from right-hand end wall (140, FIGS. 1 and 2, 140-1, FIG. 5), by a distance of about one inch. The chamber occupying this space accommodates a length of power cord of about seven inches. The chamber serves as an impact absorbing means for isolating the relatively delicate card reader subassembly (25, 138) from any blows which might occur should the terminal unit fall from a counter and hit at its right end. To further protect the card reader, the power cable has a restraining means in the form of a strain relief fitting (141, FIG. 2; 141-1, FIG. 5) for resisting the pulling of the power cable (72, 72-1) out of the impact absorbing chamber. The fitting (141, 141-1) enables the support of the terminal unit (10, 150) against falling by a holding force applied to the power cable (72, 72-1) exteriorly of the housing. For example, a clamp or the like as indicated at 142, FIG. 5, may receive the power cord (72, 72-1), for example at the rear of a supporting point-of-sale counter, so that the fall of the terminal off of the counter would be prevented or at least retarded by the engagement of the cord (72, 72-1) with the counter or with a clamp or the like such as 142 secured to the counter. Further, since the power cord leads to the right end of the terminal, the terminal is more likely to fall left end-first in any event.

In FIG. 5, terminal 150 is shown as having the power cord 72-1 coupled with a plug-in AC adapter 151 via mating and interlocking connector parts 152, 153. By way of example, the adapter 151 may receive commercial 117 volt, sixty hertz, alternating current power from a conventional wall outlet and have three output wires supplying plus 8.2 volts DC, plus fifteen volts DC and ground potential for the terminal 150. A similar arrangement to that shown at 142, and 151-153 is hereby disclosed also for the terminal 10 of FIGS. 1 and 3.

FIG. 6 illustrates a preferred form of personal identification entry unit 137 for association with the terminal 10 or 150. The unit 137 may have any suitable form of wireless coupling such as a bidirectional infrared optical link or a radio frequency link; however, in FIG. 6, as an example, a conductor type coupling 161 is shown using a coiled type cable with quick release connectors 162 and 163 at the respective ends. The unit 137 may have a battery therein for operating a random access memory so that one or more personal identification numbers may be input and stored while the unit 137 is hand-held and detached from any external power supply. However, while the unit 137 is coupled via cord 161, it may receive power from the adapter 151 by means of power supply conductors included as part of cord 161.

In an exemplary configuration, the unit 137 of FIG. 6 may be of a size to be comfortably held in one hand while a personal identification number (P.I.N.) is entered at keyboard 165. The entered number may be exhibited at a display 166 as it is entered, or prompt messages may be generated and merely a series of "X"

characters displayed as successive keys are actuated. Preferably a cowling wall 170 surrounds three sides of the display 166 and the keyboard 165 so that the personal identification number can be entered without being observed by other parties.

FIG. 7 shows a card 125-1 with a longitudinal magnetic stripe on the undersurface being inserted into a channel 180. Referring to FIG. 5, channel 180 opens at a card receiving access opening 181 which is disposed between a frontal face 182 and an upper surface 183 of the housing 15-1. The surfaces 182 and 183 join each other and effectively define an edge region such as indicated at 185 at which card 125-1 is inserted. The arrangement of the channel 180 may be such that with a standard credit or debit card fully inserted, a trailing edge of the card will project so as to be readily manually grasped and removed from the reader. A recess may be provided at 186 to facilitate grasping the trailing edge of a fully inserted credit card of minimum acceptable length. The guide means or flanges 98-1 may include flange portions at 187 and 188 which further serve to protect the card reader assembly from impact. The flange portion 188 has a gap therein defining part of the card access opening 181.

Figures 8, 13:
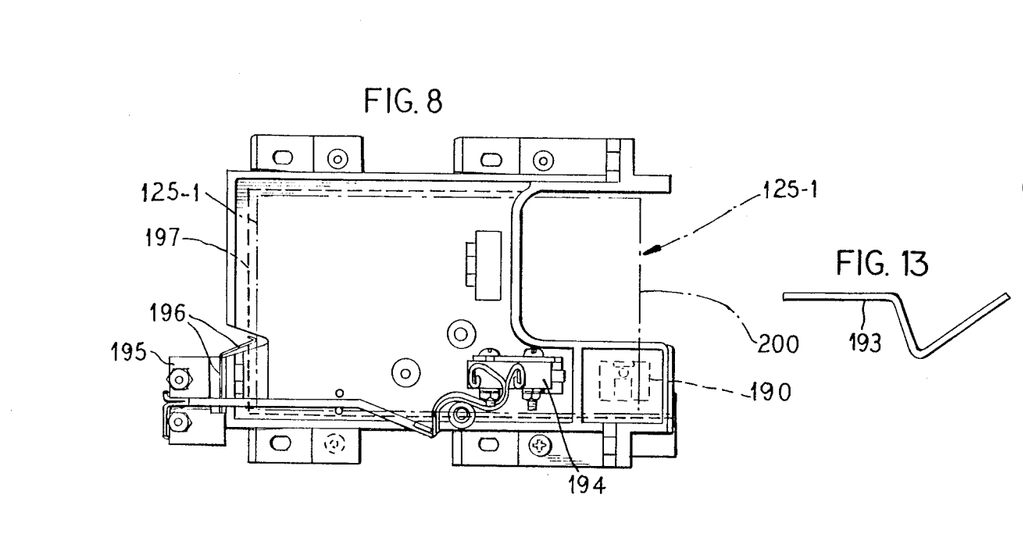
FIG. 8 is a somewhat diagrammatic top plan view of the card reader of FIG. 7.
FIGS. 13 and 14 show detail elevational views of the actuator arms for the "card present" and "card completely inserted" microswitches of the card reader of FIGS. 7–11.

As seen in FIG. 7 as the card 125-1 is inserted, read head 190 is deflected downwardly out of channel 180 against the action of its resilient mounting assembly 191. As the card is inserted further, it engages an actuator 193 which is deflected upwardly to clear the channel 180 as the card is progressively inserted. A microswitch housing is indicated at 194 in FIG. 7 which contains a microswitch for actuation by actuator 193. A further microswitch housing is indicated at 195, and as indicated in FIG. 8, this housing has an associated microswitch actuator 196 which projects into the card receiving channel, so as to be actuated when the card 125-1 reaches a final fully inserted position. As indicated in FIGS. 7 and 8, the receiving channel 180 has an end wall 197 disposed to insure that for the shortest length of card to be read, a trailing portion 200 of the card will be accessible at the corner region recess 186 so that the trailing edge can be manually grasped by the fingers for removal of the card from the channel 180. The card reader 138 may accept a range of length dimensions of the card, for example, between three and three-eighths inches and three and one-half inches.

Figure 9:
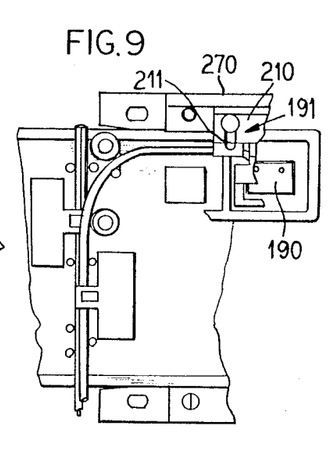
FIG. 9 is a somewhat diagrammatic partial bottom plan view of the card reader of FIG. 7.
Figures 11, 14:
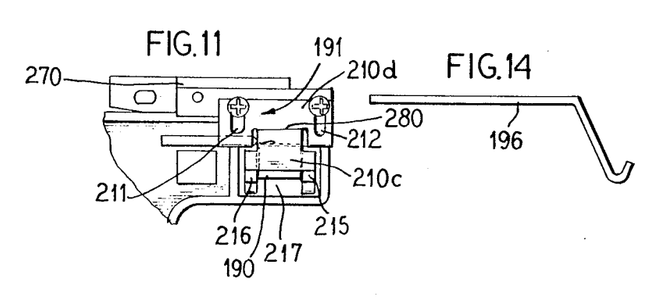
FIG. 11 is a partial enlarged detail view showing a further portion of the head mounting which is shown broken away in FIG. 9.

As seen in FIGS. 9, 10 and 11, the mounting arm 191 for the head includes a generally flat base portion 210 with a pair of slots 211 and 212 which accommodate adjustment of the head laterally of the card insertion path. The mounting arm further includes an upstanding portion 214 and respective outturned free end portions 215 and 216 which are arranged to engage a ledge surface such as 217, FIG. 10, for limiting the upward pivotal movement of the head 190.

Figure 12:
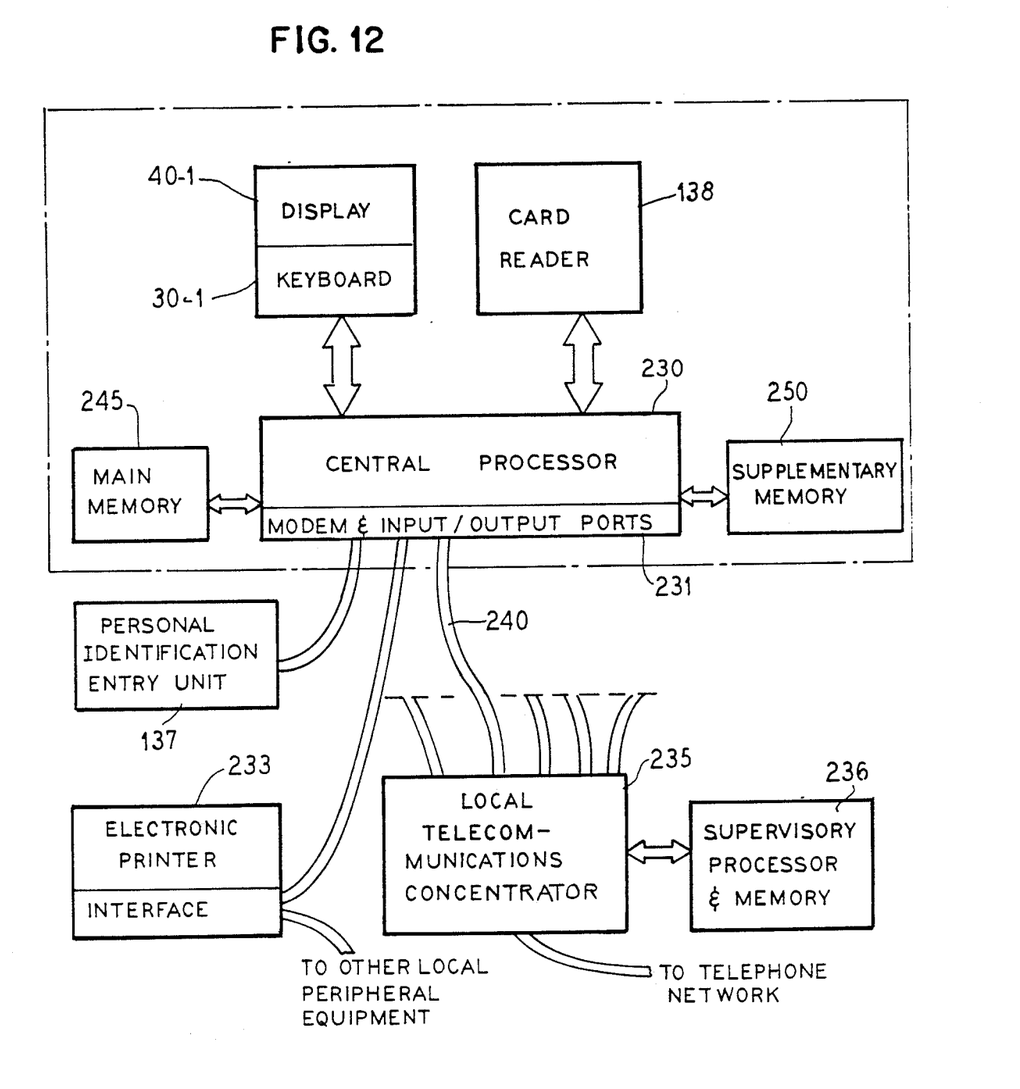
FIG. 12 is a block diagram of a system incorporating the terminal and auxiliary device of FIGS. 5 through 10.

By way of example, the insertion of the card sufficiently into the receiving channel to operate actuator 193, FIG. 7, may insure that the central processing unit 230, FIG. 12, is activated in readiness for receiving an analogue reading. A prompt message on the display 40-1 may then instruct the user to fully insert the card 125-1. When actuator 196, FIG. 8, is operated, central processor 230 may be prepared to receive the analogue data, and display 40-1 may display a prompt instructing the user to remove the card. The read is performed on the magnetic stripe as the card is withdrawn. By way of example, the card reader 138 may be able to accept speed variations from 4.0 to forty inches per second.

An exemplary specification for a successfully operating card reader system is designated by number 3800-2001, revision D dated Nov. 1, 1985. It has been found that the assembly and alignment of the illustrated card reader system requires many critical steps for a reliable operation.

As shown in FIGS. 5 and 7, a plastic adapter 220 may generally conform with the exterior contour of the card reader assembly 138 and serve to position the same at the desired inclined orientation so that the axis of the tape receiving channel 180 is directed generally toward corner region 185 where the planes of external surfaces 182 and 183 intersect (as indicated by dot-dash lines in FIG. 7).

The plastic adapter piece 220 provides ledge portions 220a and 220b for supporting the underside of the frontal edge of a card 125-1 as the card is being aligned for insertion into channel 180.

As indicated at 180a, FIG. 5, the channel 180 is of enlarged height dimension to the right of ledge 220a, while the card is relatively tightly confined in the region of channel 180 behind ledge 220a, this region having the read head 190 associated therewith as shown in FIG. 7.

The tops of the keys such as 35-1 are slightly below the plane of top surface 183 to protect the keys from any possible lateral impact. Surface 221 may be slightly higher than the plane of top surface 183.

As shown in FIG. 12, the terminal 10 or 150 may be provided with a modem and input/output ports as indicated at 231 for accommodating auxiliary equipment such as the personal identification entry unit 137 and an electronic printer 233. The central processor 230 may communicate with components such as indicated at 235 and 236 via the modem of component 231 and a telephone line connection such as indicated at 240. A main memory 245 may include components such as 45 and 50 of FIG. 4. A supplementary memory such as indicated at 250 may be provided for purposes of data capture for example of a day's transactions.

By way of example, housing 15 or 15-1 may have overall dimensions of 17.1 inches in length, about five inches in width and 3 and ⅜ths inches in height (not including mounting feet 251). The flanges 98-1 including portions 187 and 188, may be integral with the housing side and top wall section, this section being formed integrally as an aluminum extrusion by die drawing. The flanges 98-1 including portions 187 and 188 may overhang beyond the plane of side wall exterior surfaces such as 182 by a distance of 0.387 inch. The extrusion may be open at the bottom for receiving the parts 138 and 220, and other interior components.

The head pivot arm support block 270 is formed from a 0.250I0.002 inch by 0.250I0.002 inch by 1.45I0.02 inch aluminum bar.

Referring to FIGS. 10 and 11, it is found to be critical to bend the base portion 210 of the head tension arm 191 at a bend region 280 so that plane of part 210c of base 210 extends at an angle of about 9.72 angular degrees to the plane of base part 210d when the base 210 is in its unconstrained state. The mechanical set introduced at the bend region 280 tends to incline part 210c upwardly as viewed in FIG. 10. The spring 191 engages the head at inwardly projecting ledges of vertical legs 214 which are located at a plane corresponding to the bottom of the head so that the spring 191 supports the head 190 and presses the head 190 against a card in slot 180 with a total force corresponding to two hundred and fifty grams. The spring 191 is of spring steel with a uniform thickness of 0.008 inch, and s the same spring which supports the card reader head in the reader 25 of FIG. 1 which is now commercially available as shown by Appendix C previously referred to. The head 190 may be identical to the commercial head of reader 25. The length of spring section 210c as viewed in FIG. 11 is 0.350 inch.

It will be apparent that many modifications and variations may be effected without departing from the scope of the present invention.

We claim as our invention:

1. A terminal for facilitating credit card and/or debit card transactions, comprising
   a terminal housing of an elongated configuration with extended guide means at frontal and rear sides thereof,
   imprinter carriage means having rollers engaging with the guide means at an imprinter end of the housing and shiftable along the guide means to effect an imprinting operation,
   card reader means at a card reader end of the housing, said housing having card access means for admitting a card to the card reader means for reading of data therefrom,
   keyboard and display means carried by the housing, and
   power supply means comprising a plug-in power supply unit having plug means for plug-in coupling with an alternating current outlet and having low potential power transmission cable means supplying output power from the power supply unit, including a length of power cable for extending into the housing at the card reader end thereof, said housing providing impact absorbing means at the card reader end thereof outwardly of the card reader means, the card reader end of the housing having a power cable aperture through which said length of power cable extends, and having power cable restraining means engaging said length of power cable such that the housing can be supported against falling by a holding force applied to the cable means exteriorly of the housing.

2. In a terminal according to claim 1, said card reader access means comprising an access opening at an upper region of the housing at the card reader end and aligned with the card reader means such that a card can be inserted into the card reader means through said access opening.

3. In a terminal according to claim 2, said housing having said access opening extending completely across the upper region of the housing at the card reader end, said guide means comprising flanges extending along the upper region of the housing at the card reader end but having gaps therein providing parts of said access opening so that a card can be swiped through the card reader means along a path transversely to the length of the housing and from one side to the other thereof at the upper region of the housing.

4. In a terminal according to claim 2, said guide means comprising flanges extending along the upper region of the housing at the card reader end, the frontal one of the flanges at a frontal side of the housing having a gap therein aligned with the access opening such that a card can be inserted into the card reader means via a path at a frontal edge of the upper region of the housing.

* * * * *